United States Patent Office 3,357,976
Patented Dec. 12, 1967

3,357,976
MERCURY DERIVATIVES OF CERTAIN
AS-TRIAZINE-5(2H)-ONES
Albert R. Restivo, Belleville, N.J., assignor, by mesne assignments, to E. R. Squibb & Sons, Inc., New York, N.Y., a corporation of Delaware
No Drawing. Original application June 30, 1960, Ser. No. 39,768, now Patent No. 3,135,737, dated June 2, 1964. Divided and this application Aug. 7, 1963, Ser. No. 306,648
8 Claims. (Cl. 260—242)

This invention relates to the synthesis of heterocyclic organic compounds. More particularly, this invention relates to the synthesis of crystalline 2-ribofuranosyl-as-triazin-3,5(2H,4H)-dione (i.e., azauridine) by a new and improved method.

This application is a division of a prior application Serial No. 39,768, filed June 30, 1960, now U.S. Patent No. 3,135,737.

Azauridine is a known compound. The first reported chemical synthesis of it involved the reaction mercuric chloride with azauracil, treatment of the mercurated product with 1-O-acetyl-2,3,5-tribenzoyl-d-ribofuranose, and debenzoylation of the resulting ribofuranosyl derivative to yield the desired compound. This process while yielding a product having an elemental analysis which agrees with azauridine suffered the disadvantage of yielding this product in non-crystalline form.

It is an object of this invention to prepare azauridine. More particularly, it is an object of this invention to prepare azauridine by a new and improved method which entails the preparation of new intermediates, and leads to the desired product in crystalline form.

These objects are accomplished by the method of this invention which comprises treating a tautomeric compound of the Formula I:

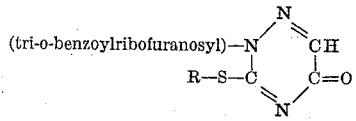

wherein R is a hydrocarbon radical of less than twelve carbon atoms such as: alkyl, especially lower alkyl (e.g., methyl, ethyl, propyl, butyl, amyl and hexyl), aralkyl, especially mono-cyclic aryl lower alkyl (e.g., benzyl, phenethyl, β-phenylpropyl, and o, m or p-tolylethyl), alkenyl especially lower alkenyl (e.g., allyl), aralkenyl especially monocyclic aryl lower alkenyl (e.g., cinnamyl) and cycloalkyl (e.g., cyclopropyl and cyclohexyl), with a mercuric salt. Preferably, the acid moiety is that of an acid, such as the hydrohalic acids (e.g., hydrochloric and hydrobromic acids), nitric acid, sulfuric acid and organic acids, such as the lower alkanoic acids (e.g., acetic, propionic and butyric acids) and aromatic acids (e.g., benzoic and o, m and p-toluic acids) to form a compound of the Formula II:

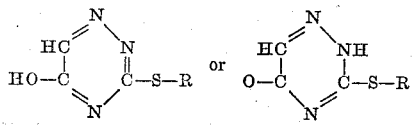

wherein R is as above defined, X is the anion of the divalent mercuric acid salt and n is the integer one or two.

The reaction is preferably conducted in an inert solvent medium, such as the lower alkanols (e.g., methanol and ethanol) and dimethylformamide. Reaction speed may be increased by warming the solution of the two reactants, but reaction will occur at room temperature. The ratio of reactants will determine the nature of the reaction product to the extent that if two moles of the triazine are employed for each mole of the mercuric salt, the reaction product will contain two moles of the triazinyl moiety (a compound of Formula II wherein n is equal to 2) whereas if a one to one ratio is employed, the reaction product will be a mercuric acid salt of Formula II wherein n is equal to one.

A compound of Formula II is next reacted with tri-O-benzoyl-D-ribofuranosyl chloride to yield a compound of the Formula III:

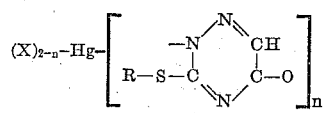

wherein R is as hereinbefore defined. The reaction is conducted in a solvent medium and preferably under reflux conditions. Suitable solvents are non-polar solvents such as the aromatic hydrocarbons (e.g., benzene and toluene). The reaction product is isolated from the liquid portion of the reaction mixture by filtration and concentration of the filtrate.

Compounds of Formula III are converted to the compound 2-(tri-O-benzoylribofuranosyl)-as-triazin-3,5(2H, 4H)-dione by hydrolytically removing the 3-RS-radical from the thiazinyl nucleus. This can readily be accomplished by treating the compounds of Formula III with an acidic aqueous alkanolic solution (e.g., hydrochloric acid in aqueous ethanol) under reflux conditions. The hydrolysis product is converted to azauridine by further hydrolysis with a strong base such as aqueous ammonia.

The starting materials for this invention, i.e., the compounds of Formula I, are new compounds prepared by first condensing substantially equimolar amounts of a solution glyoxylic acid (preferably as the hemihydrate) and thiosemicarbazide, in a suitable solvent such as a lower alkanol (e.g., methanol, ethanol or propanol). The condensation product is then treated in situ with a compound of the formula: R-halide, wherein R is as hereinbefore defined, the halide preferably being iodide. The alkylation is conducted under basic conditions (e.g., in the presence of an alkali metal hydroxide such as sodium or potassium hydroxide). The compound of Formula I is separated from the reaction mixture by filtration. It may be used in this form or further purified as desired, in carrying the process of this invention.

Alternatively, the compounds of Formula I may be prepared by the condensation reaction of glyoxylic acid (preferably as the hemihydrate) with a salt (preferably a hydrohalide) of 3-R-thiosemicarbazide, wherein R is as hereinbefore defined, in the presence of a strong base such as an alkali metal hydroxide (e.g., sodium or potassium hydroxide). The product may be separated from the reaction mixture by the separation procedure hereinbefore noted, or it may be employed in the next synthetic step without further purification.

The following examples are presented to more fully illustrate the invention, all temperatures being expressed in degrees centigrade.

EXAMPLE 1

*3-(methylthio)-1,2,4-as-triazin-5-(2H)-one*

To a solution of 82.3 g. (0.9 mole) of thiosemicarbazide in 2.25 l. of 80% ethanol at 70° is added 89.9 g. (0.9 mole) of glyoxylic acid, hemihydrate in 450 ml. of 80% ethanol. After a few minutes the solution is diluted with 250 ml. N sodium hydroxide (1.0 mole) followed by addition of 142 g. (1.0 mole) of methyl iodide. The mixture is refluxed for 2½ hours and then concentrated to one-third the original volume. After cooling the crude product is filtered and recrystallized from ethyl acetate to yield about 65.0 g. of 3-(methylthio)-1,2,4-as-triazin-5-(2H)-one, M.P. 221–222°.

*Analysis.*—Calc'd for $C_4H_5N_3OS$: N, 29.35%; S, 22.40%. Found: N, 29.03%; S, 22.56%.

EXAMPLE 2

*3-(benzylthio)-1,2,4-as-triazine-5-(2H)-one*

Following the procedure of Example 1 except for the substitution of 218 g. of benzyl iodide for the methyl iodide used therein, there is obtained the product 3-(benzylthio)-1,2,4-as-triazin-5-(2H)-one.

EXAMPLE 3

*3-(methylthio)-1,2,4-as-triazine-5-(2H)-one*

A suspension of 45.6 g. (0.5 mole) of thiosemicarbazide in 900 ml. of absolute ethanol is heated to 40°. After adding 71.0 g. (0.5 mole) of methyl iodide the resulting solution is refluxed for 1½ hours. On cooling the white precipitate is filtered and washed with ether to give about 68.8 g. 3-methylthiosemicarbazide, M.P. 136–137°. A second crop of 8.4 g. of product, M.P. 136–137° is obtained from the mother liquor.

A solution of 17.2 g. of the 3-methylthiosemicarbazide in 90 ml. of $H_2O$ is treated at room temperature with a solution of 5.8 g. of glyoxylic acid hemihydrate in 75 ml. of N NaOH. After cooling, the precipitate (presumably 3-methylthiosemicarbazone, glyoxylic acid) is filtered to give 11.16 g. of material M.P. 180–190°. When this material is refluxed in 700 ml. of 95% ethanol for 3½ hours there is separated a total of 2.67 g. of 3-methylthio-1,2,4-as-triazin-5(2H)-one.

EXAMPLE 4

*2,2'-mercuribis-[3-(methylthio)-as-triazin-5-(2H)-one]*

A warm solution of 6.38 g. (0.02 mole) of mercuric acetate in 50 ml. of methanol is added to a warm solution of 5.72 g. (0.04 mole) of the product of Example 1. After cooling, the precipitate is filtered and washed successively with water, ethanol and ether giving about 8.6 g. of 2,2'-mercuribis-[3-(methylthio)-as-triazin-5-(2H)-one] having the following analysis.

*Analysis.*—Calc'd for $C_8H_8N_2S_2OHg$: N, 17.33%. Found: N, 16.77%.

EXAMPLE 5

*2-(chloromercuri)-3-(methylthio)-as-triazin-5-(2H)-one*

To a warm solution of 1.43 g. (0.01 mole) of 3-(methylthio)-as-triazin-5-ol in 10 ml. of 1 N sodium hydroxide is added a solution of 2.7 g. (0.01 mole) of mercuric chloride in 5 ml. of warm ethanol. After refrigeration the precipitate is filtered and washed successively with $H_2O$, ethanol and ether. The product weighs about 3.42 g. and has the following analysis.

*Analysis.*—Calc'd for $C_4H_4ClHgN_3OS$: Cl, 9.37%; N, 11.11%. Found: Cl, 9.24%; N, 10.94%.

EXAMPLE 6

*2,2'-mercuribis[3-(benzylthio)-as-triazin-5(2H)-one]*

Following the procedure of Example 4 except for the substitution of 8.76 g. of the product of Example 2 as the starting material, there is obtained the product 2,2'-mercuribis-[3-(benzylthio)-as-triazin-5(2H)-one].

EXAMPLE 7

*3-(methylthio)-2-(tri-O-benzoylribofuranosyl)-as-triazin-5-(2H)-one*

To a dry suspension of 3.76 g. of the product of Example 4 in 100 ml. of toluene is added 15.0 g. of tri-O-benzoyl-D-ribofuranosyl chloride in benzene. The mixture is distilled to remove the benzene and then refluxed for ¾ hour, cooled and filtered. The filtrate is concentrated to dryness and the residue picked up in chloroform. The extract is washed with dilute KI solution, water, dried and then concentrated to leave as residue the product 3-(methylthio) - 2-(tri-O-benzoylribofuranosyl)-as-triazin-5-(2H)-one.

EXAMPLE 8

*3-(benzylthio)-2-(tri-O-benzoylribofuranosyl)-as-triazin-5(2H)-one*

Following the procedure of Example 7 except for the substitution of 4.93 g. of the product of Example 6 as starting material, there is obtained as final product the compound 3-(benzylthio)-2-(tri-O-benzoylribofuranosyl)-as-triazin-5(2H)-one.

EXAMPLE 9

*3 - (methylthio) - 2 - (tri-O-benzoylribofuranosyl)-as-triazin-5(2H)-one*

To a suspension of 5.86 g. of the product of Example 5 in 100 ml. of toluene is added 15.0 g. of tri-O-benzoyl-D-ribofuranosyl chloride in benzene. The mixture is distilled to remove the benzene and then refluxed for ¾ hour, cooled and filtered. The filtrate is concentrated to dryness and the residue picked up in chloroform. The extract is washed with dilute KI solution, water, dried and then concentrated to leave as residue the product 3-(methylthio) - 2-(tri-O-benzoylribofuranosyl)-as-triazin-5(2H)-one.

EXAMPLE 10

*2-(tri-O-benzoylribofuranosyl)-as-triazin-3,5-(2H,4H)-dione*

(A) From 3-(methylthio)-2-(tri-O-benzoylribofuranosyl)-as-triazin-5(2H)-one 0.59 g. of the product of Example 7 is dissolved in 200 ml. of 95% ethanol, and the solution is treated with concentrated HCl and refluxed for 1½ hours. The solution is then concentrated slightly, whereupon crystals form. The crystals are filtered off and then recrystallized from ethyl acetate yielding substantially pure 2-(tri-O-benzoylribofuranosyl)-as-triazin-3,5-(2H,4H)-dione having the following characteristics: M.P. about 191–194°.

*Analysis.*—Calc'd for $C_{29}H_{23}N_3O_9$: C, 62.47%; H, 4.16%; N, 7.55%. Found: C, 62.02%; H, 4.11%; N, 7.53%.

(B) From 3 - (benzylthio)-2-(tri-O-benzoylribofuranosyl)-as-triazin-5(2H)-one an equivalent amount of the product of Example 8 is substituted as starting material in the procedure of Part A supra to yield a product which is the same as the product obtained in Part A.

EXAMPLE 11

*2-ribofuranosyl-as-triazin-3,5(2H,4H)-dione (azauridine)*

A solution of 590 mg. (1.06 mmoles) of the product of Example 10 in 200 ml. of methanol saturated at 5° with ammonia is held for three days at room temperature. After concentration to dryness the residual syrup is picked up in water and the extract washed with ether. The aqueous solution is concentrated to dryness and the residue dissolved in absolute ethanol and reconcentrated. This operation is repeated several times to remove all traces of water. Recrystallization of the residue from absolute ethanol gives 160 mg. (61.6%) of azauridine, M.P. 157–159° (undepressed on admixture with authentic material, produced biosynthetically); with U.V.

$(\lambda_{max.}^{0.2N\ NaOH}\ 257,\ E_1^1\ 285)$ and infra red determinations also being identical with authentic material.

*Analysis.*—Calc'd for $C_8H_{11}N_3O_6$: C, 39.19%; H, 4.52%; N, 17.14%. Found: C, 39.79%; H, 4.56%; N, 17.34%.

This invention may be variously otherwise embodied within the scope of the appended claims.

What is claimed is:

1. A compound of the formula:

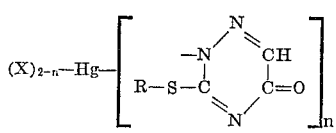

wherein R is a hydrocarbon radical of less than twelve carbon atoms, X is halide, and n is a positive integer less than 3.

2. A compound of the formula:

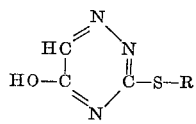

wherein R is a hydrocarbon radical of less than twelve carbon atoms.

3. The compound 3 - (benzylthio) - 1,2,4-as-triazin-5-(2H)-one.

4. The compound 2,2'-mercuribis-[3-(methylthio)-as-triazin-5(2H)-one].

5. The compound 2-(chloromercuri)-3-(methylthio)-as-triazin-5(2H)-one.

6. The compound 2,2'-mercuribis-[3-(benzylthio)-as-triazin-5(2H)-one].

7. A process for the preparation of the compound of claim 1 which comprises treating a compound of the formula

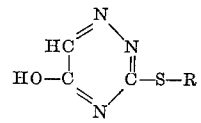

wherein R is a hydrocarbon radical of less than twelve carbon atoms, with a mercuric salt.

8. A process for the preparation of the compounds of claim 2 which comprises reacting a compound selected from the group consisting of glyoxylic acid and a hydrate thereof, with thiosemicarbazide, and treating the resulting 3 - mercapto - 1,2,4-as-triazin-5(2H)-one with an R-halide wherein R is a hydrocarbon radical of less than twelve carbon atoms.

References Cited
FOREIGN PATENTS
951,996 11/1956 Germany.

OTHER REFERENCES
Falco et al., J.A.C.S., vol. 78, 1938–41 (1956).
Chemical Abstracts, vol. 55, col. 2677 (1961) abstracting Hadacek et al., "Spisy vyd. piired. fak. Masarkovy Univ.," No. 6, pp. 269–77 (1958).
Gut et al., Coll. Czech. Chem. Comm., vol. 24, pp. 2986–91 (1959).

JOHN D. RANDOLPH, *Primary Examiner.*
WALTER A. MODANCE, *Examiner.*
R. T. BOND, *Assistant Examiner.*